(12) United States Patent
Hartog

(10) Patent No.: US 9,377,106 B2
(45) Date of Patent: Jun. 28, 2016

(54) RAMPED FILTER VESSEL

(71) Applicant: Pall Corporation, Port Washington, NY (US)

(72) Inventor: Ronald Lewis Hartog, Union Pier, MI (US)

(73) Assignee: Pall Corporation, Port Washington, NY (US)

( * ) Notice: Subject to any disclaimer, the term of this patent is extended or adjusted under 35 U.S.C. 154(b) by 142 days.

(21) Appl. No.: 14/516,063

(22) Filed: Oct. 16, 2014

(65) Prior Publication Data

US 2015/0107205 A1  Apr. 23, 2015

Related U.S. Application Data

(60) Provisional application No. 61/892,692, filed on Oct. 18, 2013.

(51) Int. Cl.
| | |
|---|---|
| *F16J 13/06* | (2006.01) |
| *B01D 35/30* | (2006.01) |
| *B01D 46/00* | (2006.01) |
| *F16J 13/12* | (2006.01) |
| *B01D 29/52* | (2006.01) |
| *F16J 13/18* | (2006.01) |

(52) U.S. Cl.
CPC .............. *F16J 13/065* (2013.01); *B01D 29/52* (2013.01); *B01D 35/30* (2013.01); *B01D 46/0004* (2013.01); *F16J 13/12* (2013.01); *F16J 13/18* (2013.01); *B01D 2201/0446* (2013.01); *B01D 2201/301* (2013.01); *B01D 2201/4007* (2013.01); *B01D 2201/4076* (2013.01)

(58) Field of Classification Search
CPC .......... F16J 13/06; F16J 13/065; F16J 13/12; F16J 13/18; B01D 35/30; B01D 46/0002; B01D 46/0004; B01D 2201/301; B01D 2201/305; B01D 2201/4007; B01D 2201/4076; B01D 2265/025
See application file for complete search history.

(56) References Cited

U.S. PATENT DOCUMENTS

| | | | | |
|---|---|---|---|---|
| 3,311,255 | A * | 3/1967 | Loveless .................. | F16J 13/06 220/211 |
| 3,488,883 | A * | 1/1970 | Piegza ..................... | F16J 13/12 220/291 |
| 4,215,790 | A | 8/1980 | Ribble et al. | |
| 6,401,958 | B1 * | 6/2002 | Foss ........................ | F16J 13/06 220/320 |
| 6,793,818 | B1 | 9/2004 | Entringer et al. | |
| 2004/0118849 | A1 * | 6/2004 | Rosaen ..................... | F16J 13/04 220/291 |
| 2006/0278633 | A1 * | 12/2006 | Cacace ................... | B29C 70/48 220/4.12 |
| 2010/0044379 | A1 * | 2/2010 | Asterlin ................... | F16J 13/22 220/324 |

FOREIGN PATENT DOCUMENTS

| | | |
|---|---|---|
| KR | 10-2003-0033760 A | 1/2003 |
| WO | WO 01/42688 A1 | 6/2001 |

* cited by examiner

*Primary Examiner* — Robert Clemente
(74) *Attorney, Agent, or Firm* — Jeremy Jay

(57) ABSTRACT

A filter vessel has a housing and a lid which together define an internal chamber for carrying a filter. A gasket is positioned between the lid and the housing. In a locked position, the lid and the housing are in sealed contact with the gasket.

1 Claim, 9 Drawing Sheets

RAMPED FILTER VESSEL

BACKGROUND OF THE INVENTION

The present disclosure relates to a filter vessel. Filter vessels are containers which carry one or more filters. Such filters are suitable for filtering fluids, such as liquids or gases. Such filters may be bag filters, cartridge filters, or other suitable filters as are known in the art.

Filter vessels are well known in the art. Filter vessels are typically formed having a housing and a lid. Together, the housing and the lid define an internal cavity which carries one or more filters. The lid is typically joined to the housing by a hinge, such that the lid may be opened and closed about the hinge. Further, the lid is typically clamped in place to ensure that the fluid being filtered does not escape through the seal formed between the lid and the housing. A gasket is disposed between the lid and the housing to aid in forming a seal therebetween.

Prior art filter vessels were sealed by rotating the lid relative the housing. This rotation is translated into a clamping force by camming surfaces. In previous filter vessels, this rotation caused rotational forces on the gaskets as the lids rotate, which rotational forces on the gaskets may cause the gaskets to bind, buckle, bend, or otherwise strain or contort. A gasket which is strained or contorted may not make a complete seal between the lid and the housing and/or may have a reduced lifespan. As such, an improved filter vessel is needed which includes a clamping mechanism which does not cause rotational forces on the gasket between the lid and the housing.

SUMMARY OF THE INVENTION

The present disclosure describes a filter vessel defined by a lid and a housing. The lid includes a support portion terminating in a lower edge. A locking arm is joined at a locking arm hinge to the lid and includes a tooth extending therefrom. A lid support ring includes an inner surface which is sized to sheath around the support portion of the lid. The lid support ring is joined to the lid at the support portion. The lid support ring includes an outer surface which carries an upper cam block having a camming surface.

The housing includes a support portion terminating in an upper edge. The lid and the housing together define an internal chamber for carrying a filter.

A hinge joins the lid to the housing. A housing support ring includes an inner surface which is sized to sheath around the support portion of the housing. The housing support ring is joined to the housing at the support portion. The housing support ring includes an outer surface which carries a lower cam block having a camming surface.

A post is carried on the housing support ring and extends from the outer surface of the housing support ring.

A gasket is positioned between the lid and the housing.

A locking ring is positioned around the lid support ring and the housing support ring and is supported on the post. The locking ring is defined as a cylinder extending between an upper edge and a lower edge. An upper cam arm is joined to the upper edge of the support ring and extends toward the lid support ring. A lower cam arm is joined to the lower edge of the locking ring and extends toward the housing support ring. A spring-loaded bushing is joined to the locking ring, wherein the spring-loaded bushing defines a gap between the locking ring and the lid support ring and the housing support ring. A notch formed in the upper edge of the locking ring.

A locked positioned is defined by the tooth of the locking arm seated in the notch of the locking ring and the upper cam block and the lower cam block clamped between the upper cam arm and the lower cam arm. The locking ring is prevented from rotating relative the lid when in the locked position. The upper cam arm and the lower cam arm clamp the lid and the housing in sealed contact with the gasket when in the locked position.

An unlocked position is defined by the tooth of the locking arm not seated in the notch of the locking ring and the upper cam block and the lower cam block not sandwiched between the upper cam arm and the lower cam arm.

BRIEF DESCRIPTION OF THE DRAWINGS

A preferred embodiment of this invention has been chosen wherein.

DESCRIPTION OF THE PREFERRED EMBODIMENT

Figure 1:
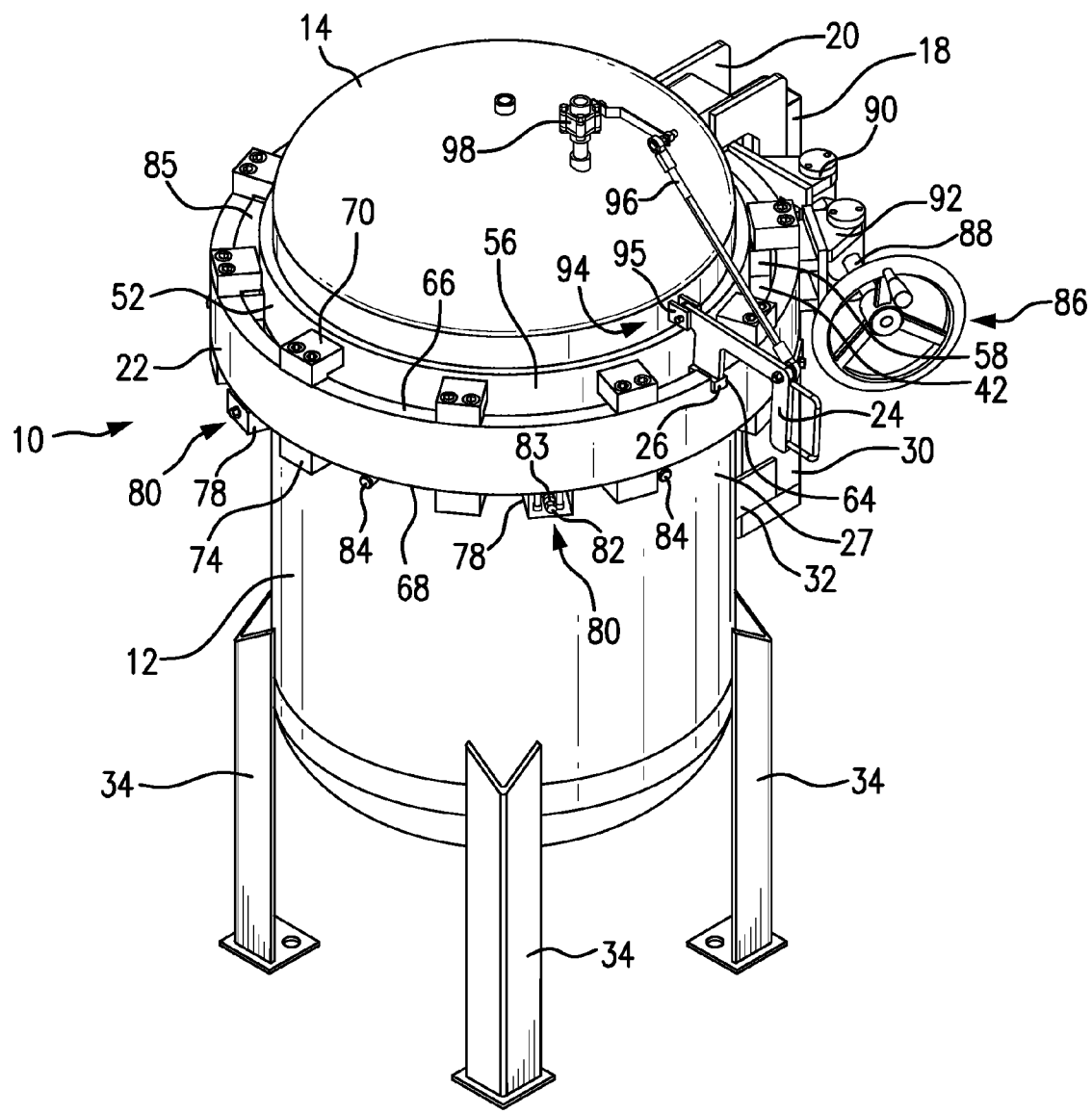
FIG. 1 is a perspective view of the filter vessel with the lid in the closed position.
Figure 2:
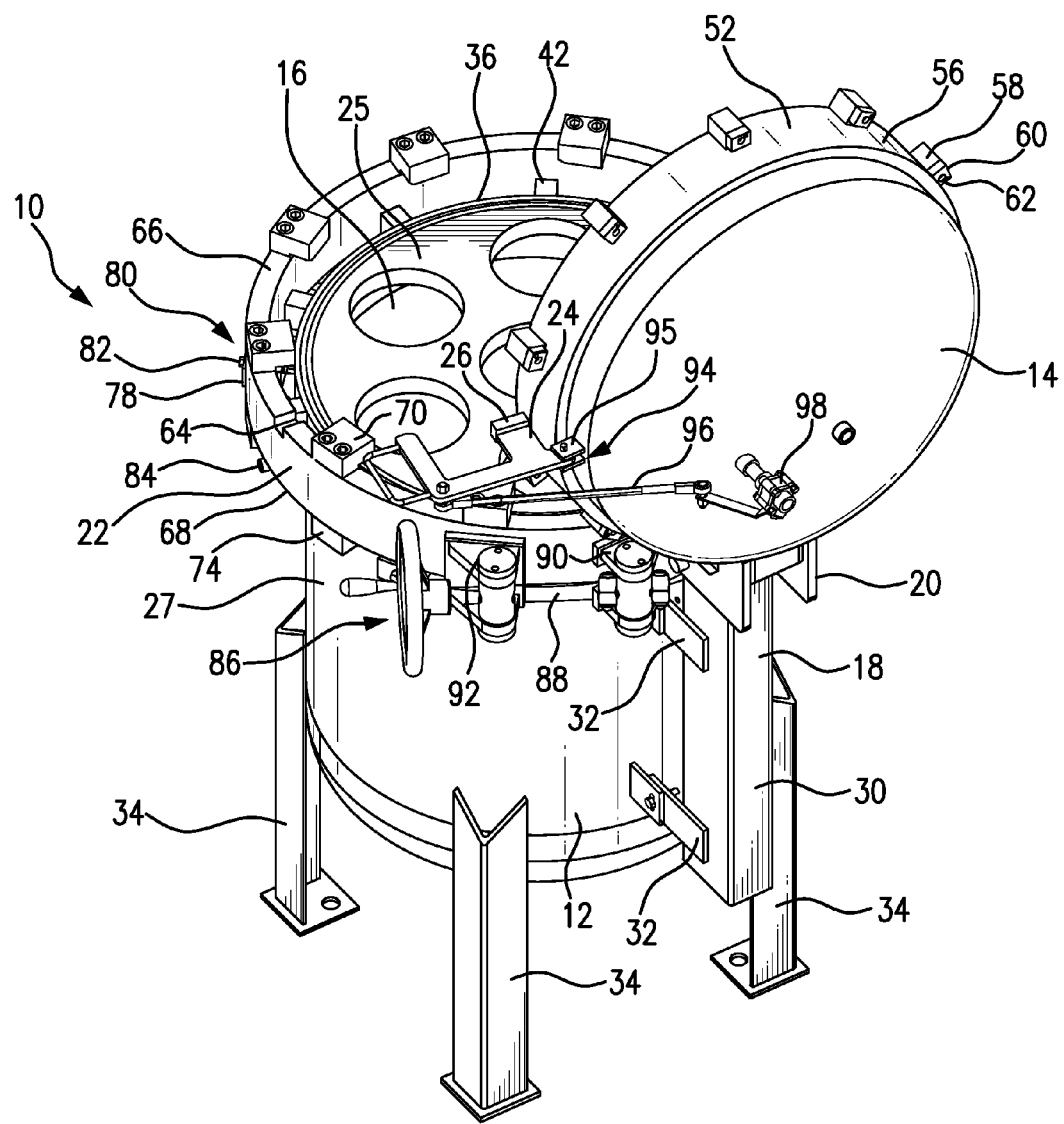
FIG. 2 is a perspective view of the filter vessel of FIG. 1, with the lid in the open position.

Referring to FIG. 1, the present disclosure describes a filter vessel 10 defined by a housing 12 and a lid 14. Together, the housing 12 and the lid 14 define an internal chamber 16 (see FIG. 3), which internal chamber 16 is suitable for carrying a filter. The lid 14 is joined to the housing 12 by a lid support 18 which includes a hinge 20 which allows the lid 14 to move between an open position and a closed position. The filter vessel 10 includes a locking ring 22 which is rotatable between a locked position, where the lid 14 is clamped in the closed position, and an unlocked position, where the lid 14 is movable to the open position. A locking arm 24 is joined to the lid 14 and includes a tooth 26. The locking ring 22 includes a notch 64 where the tooth 26 is seated to restrict the locking ring 22 to the locked position. FIG. 1 provides a perspective view of the filter vessel 10 with the locking ring 22 in the locked position and the lid 14 in closed position. FIG. 2 provides a perspective view of the filter vessel 10 with the locking ring 22 in the unlocked position and the lid 14 in the open position.

Figure 3:
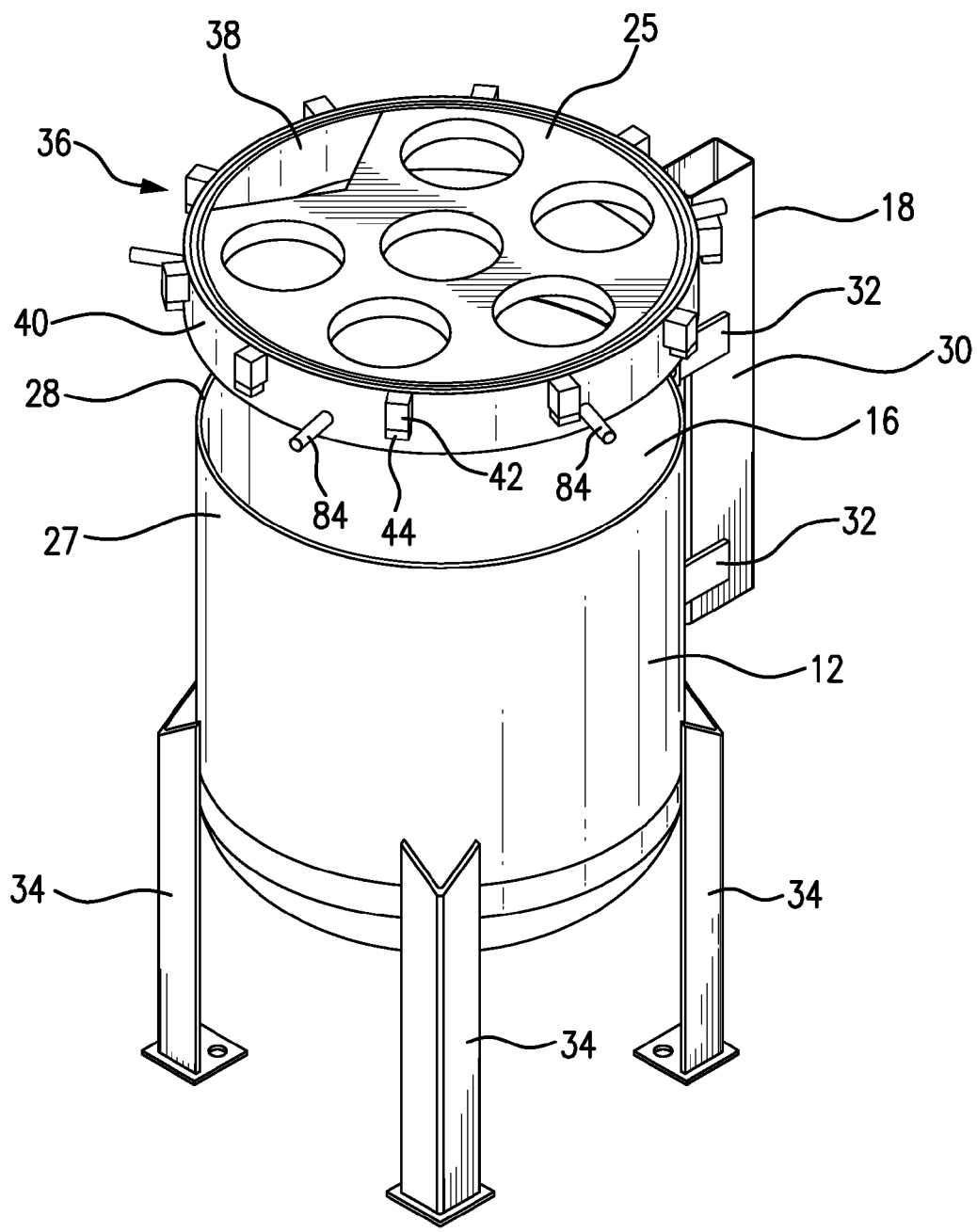
FIG. 3 is a perspective view of the housing of the fitter vessel, with the support ring in exploded view.
Figure 4:
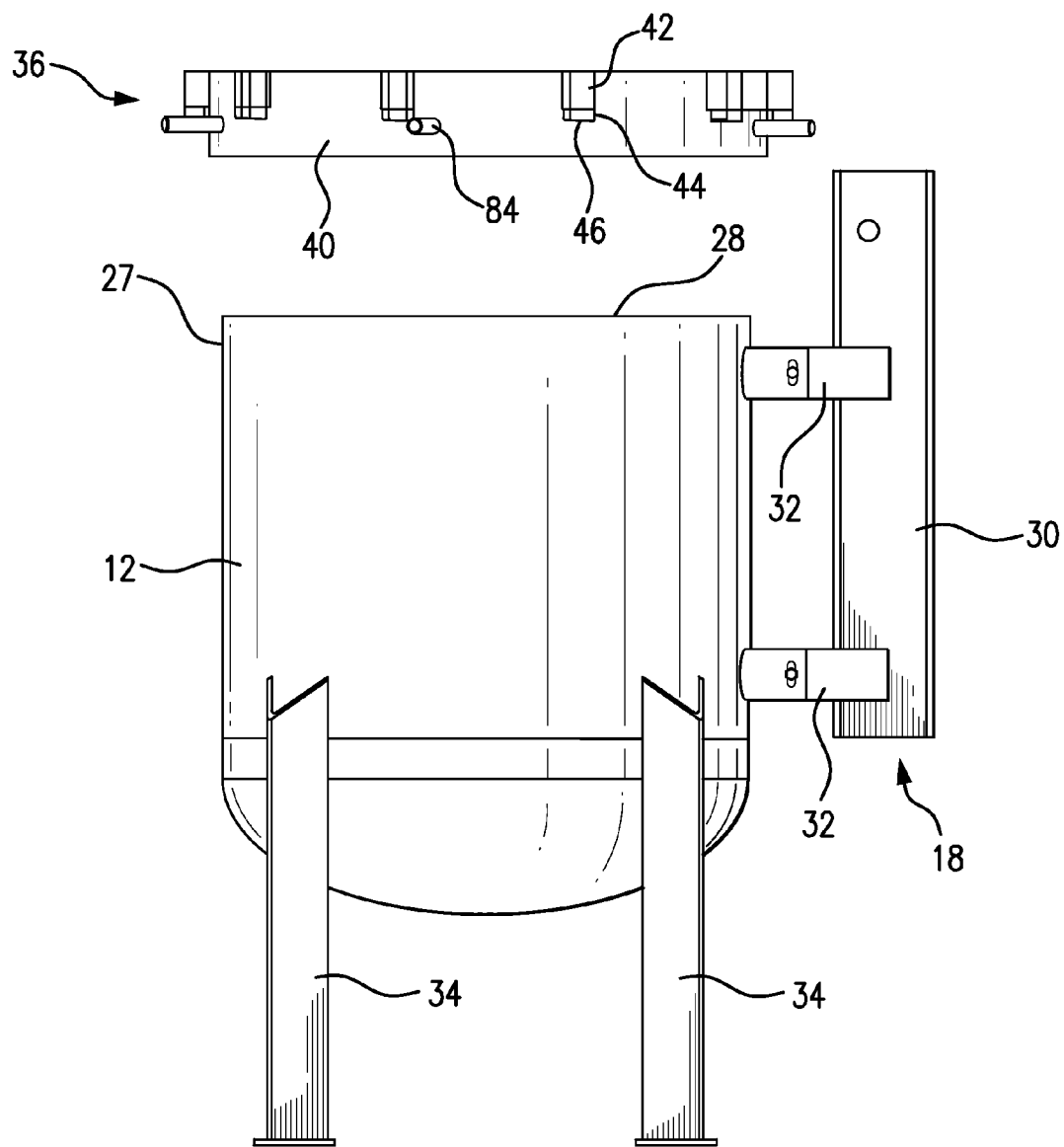
FIG. 4 is a side view of the housing and support ring of FIG. 3.

Referring to FIGS. 3 and 4, the lower end of the filter vessel 10 is defined by the housing 12. The housing 12 is a generally cylindrical structure which defines a portion of the internal chamber 16. The internal chamber 16 preferably carries one or more filters. In one embodiment, the filters are carried by a filter support ring 25, or other suitable structure as is known in the art. The housing 12 includes an upper end defined by a support portion 27 which is the upper-most portion of the housing 12 and is generally-cylindrical and terminates at an upper edge 28. The housing 12 is preferably formed from reinforced plastic. The reinforced plastic is preferably from a plastic resin reinforced with fiber, where the fiber may be fiberglass, Kevlar, carbon fiber, spectra or other reinforcing fibers as are known in the art. The plastic resin is preferably a durable plastic, such as polyester, vinyl ester, or epoxy.

The lid support 18 is joined to the side of the exterior of the housing 12. The lid support 18 includes an upright column 30 which is joined to the housing 12 by one or more brackets 32. The hinge 20 is joined to the upper end of the lid support 18, as shown in FIG. 1, and discussed in greater detail herein.

The housing is preferably supported by one or more support members 34. The support members 34 are preferably legs joined to the lower end of the housing 12.

A housing support ring 36 is a generally cylindrical ring having a substantially-cylindrical inner surface 38 and an outer surface 40. The inner surface 38 is shaped to sheath around the support portion 27 of the housing 12. A resin, or other suitable bonding agent, is used to join the inner surface 38 of the housing support ring 36 to the support portion 27. The resins preferably structural adhesive or epoxy resin. The housing support ring 36 is preferably formed of metal, preferably steel or stainless steel. FIGS. 3 and 4 show the housing support ring 36 and the housing 12 in exploded view; FIGS. 1 and 2 show the housing support ring 36 as installed on the housing 12 with the housing support ring 36 bonded to the housing 12.

A lower cam block support 42 is joined to the outer surface 40 of the housing support ring 36. A lower cam block 44 is carried on the lower cam block support 42. The lower cam block 44 includes a ramped camming surface 46. In the preferred embodiment, a plurality of lower cam block support 42 l lower cam block 44 pairs are spaced around the outer surface 40 of the support ring 36. A post 84 extends outwardly from the outer surface 40 of the housing support ring 36. As described in greater detail below, a plurality of posts 84 are spaced around the housing support ring 36 and together, the posts 84 support the locking ring 22.

Figure 5:
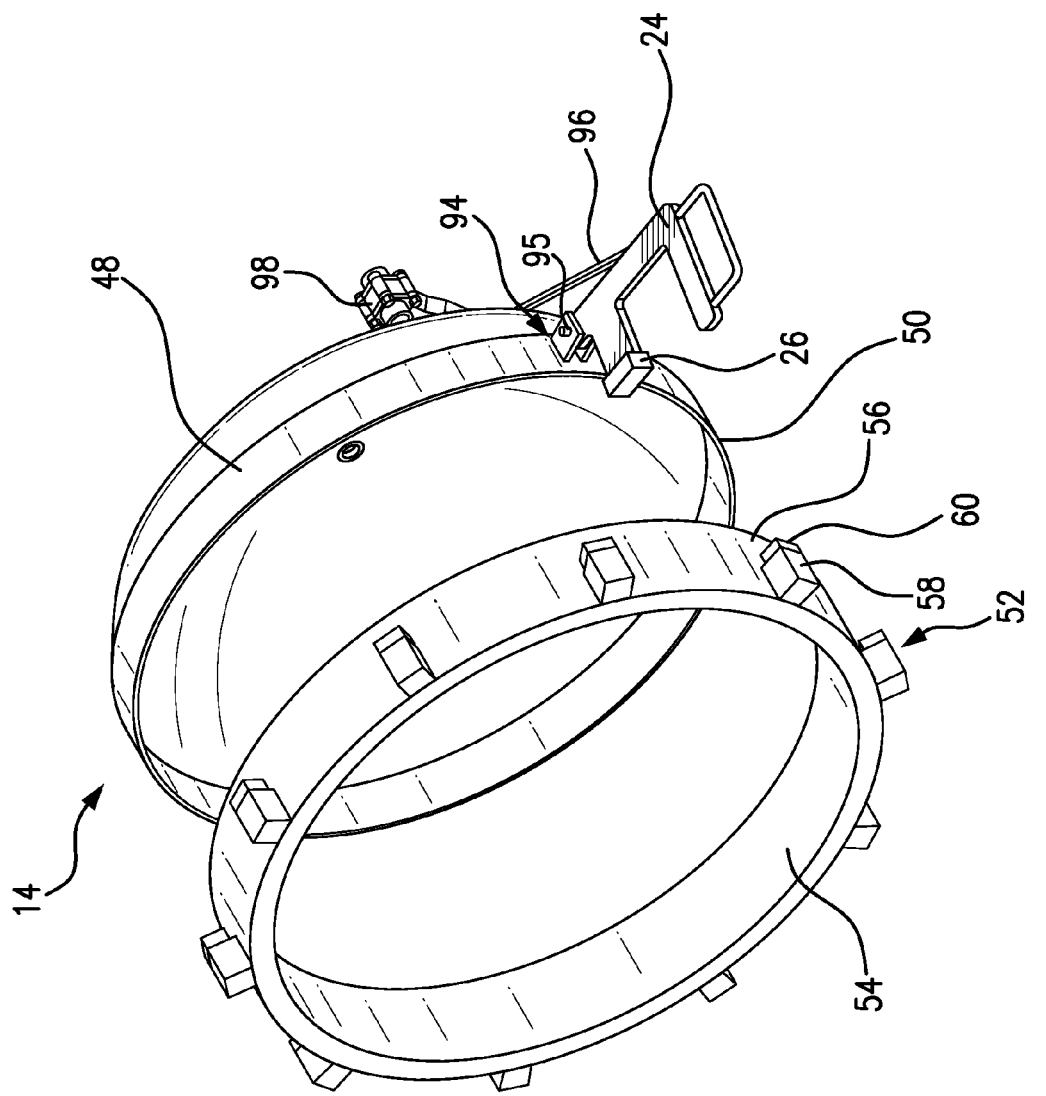
FIG. 5 is a perspective view of the lid of the filter vessel, as removed from the housing, with the support ring in exploded view.
Figure 6:
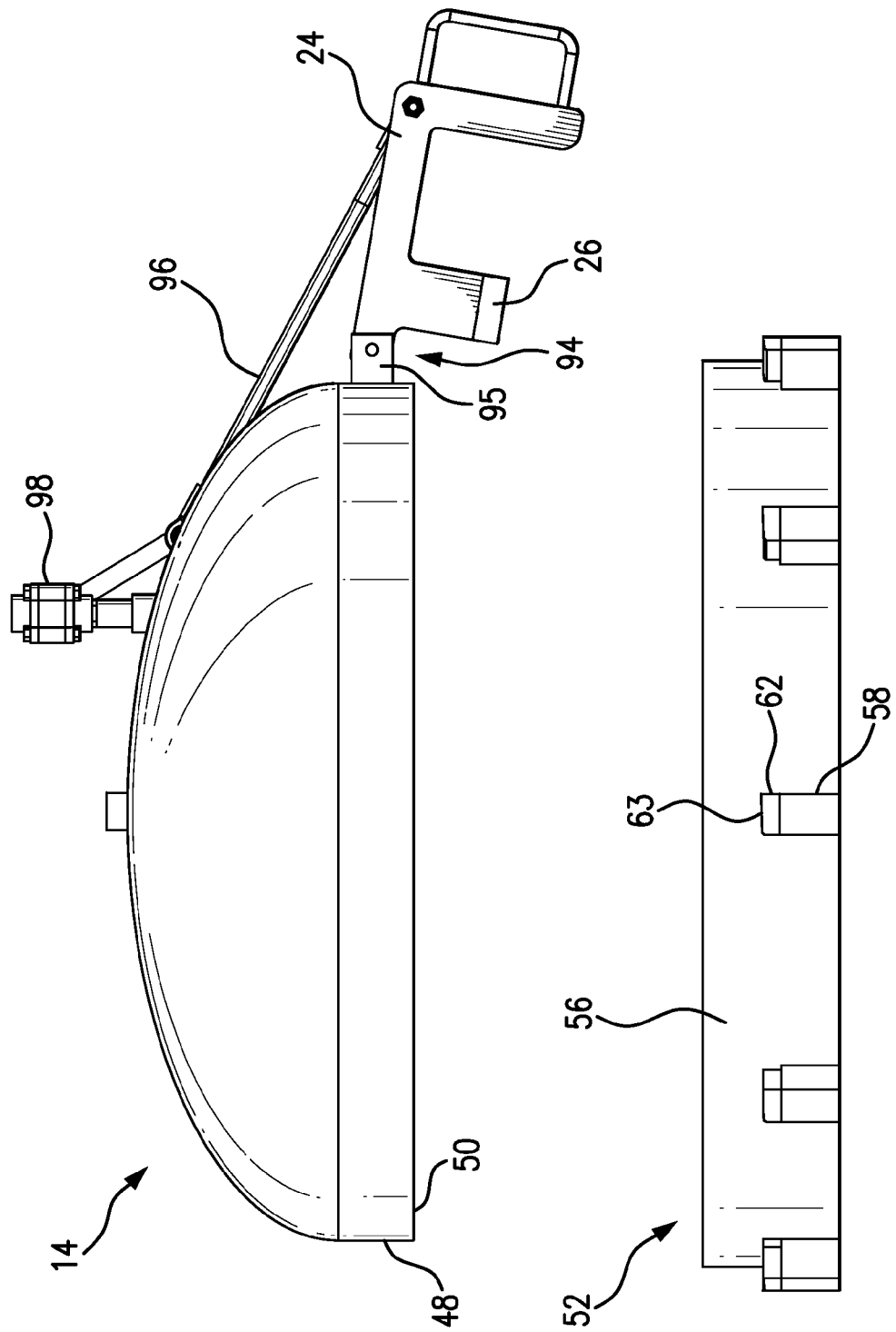
FIG. 6 is a side view of the lid and support ring of FIG. 5.

Referring now to FIGS. 5 and 6, the lid 14 forms the upper portion of the filter vessel 10, and is shaped and sized to cap the housing 12. The lid 14 includes a support portion 48 which forms the portion of the lid 14 adjacent the housing 12. The support portion 48 is preferably generally cylindrical. The support portion 48 forms the lower portion of the lid 14 and terminates at a lower edge 50.

A lid support ring 52 is a generally cylindrical ring having a substantially-cylindrical inner surface 54 and an outer surface 56. The inner surface 54 is shaped to sheath around the support portion 48 of the lid 14. A resin or other suitable bonding agent is used to join the inner surface 54 of the lid support ring 52 to the support portion 48. The lid support ring 52 is preferably formed of metal. FIGS. 5 and 6 show the lid support ring 52 and the lid 14 in exploded view; FIGS. 1 and 2 show the lid support ring 52 as installed on the lid 14 with the lid support ring 52 bonded to the lid 14.

An upper cam block support 58 is joined to the outer surface 56 of the lid support ring 52. An upper cam block 60 is carried on the upper cam block support 58. The upper cam block 60 includes a ramped camming surface 62. In the preferred embodiment, a plurality of upper cam block support 58 l upper cam block 60 pairs are spaced around the outer surface 56 of the support ring 52.

Figure 7:
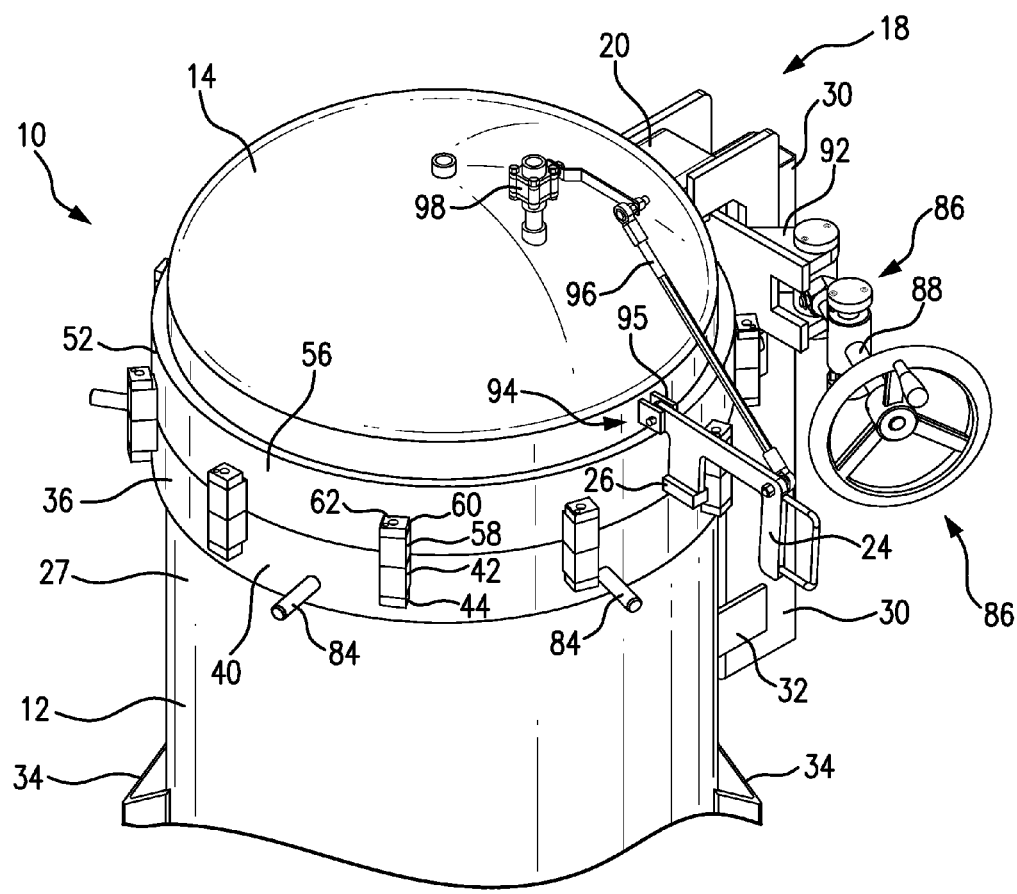
FIG. 7 is a perspective view of the filter vessel with the support ring removed to show the detail of the support rings.
Figure 8:
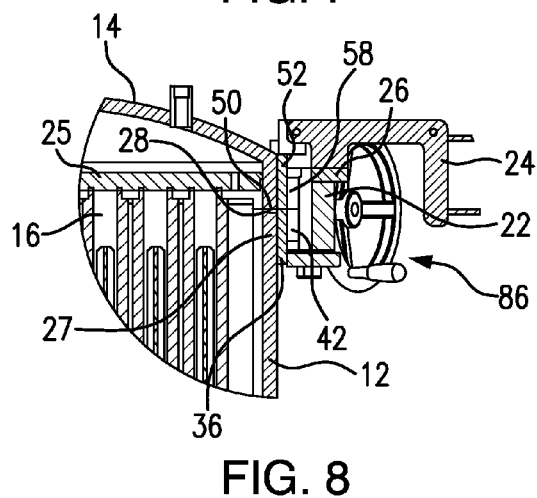
FIG. 8 is a sectional side view of the filter vessel showing the interface between the lid support and the lid and the interface between housing support and the housing.

Referring to FIG. 7, the filter vessel 10 is shown with the locking ring 22 removed. As shown, the lid 14 is in the closed position on the housing 12. When the lid is in the closed position, the lower end of the lid support ring 52 contacts the upper end of the housing support ring 36. Preferably, when the lid 14 is in the closed position, the upper cam block support 58 is aligned with and contacts the lower cam block support 42. In the preferred embodiment, a plurality of upper cam block support 58/lower cam block support 42 pairs are spaced around the filter vessel 10. When closed, the lower edge 50 of the lid 14 contacts the upper edge 28 of the housing 12, as shown in FIG. 8. In the preferred embodiment, a gasket is sandwiched between the lower edge 50 of the lid 14 and the upper edge 28 of the housing 12 to form a seal between the lid 14 and the housing 12. Alternatively, the gasket is sandwiched between the lid support ring 52 and the housing support ring 36. As shown in FIG. 7, the lid hinge 20 is carried on the support column 30, such that the lid 14 pivots between the open position and the closed position about the hinge 20.

Figure 9:
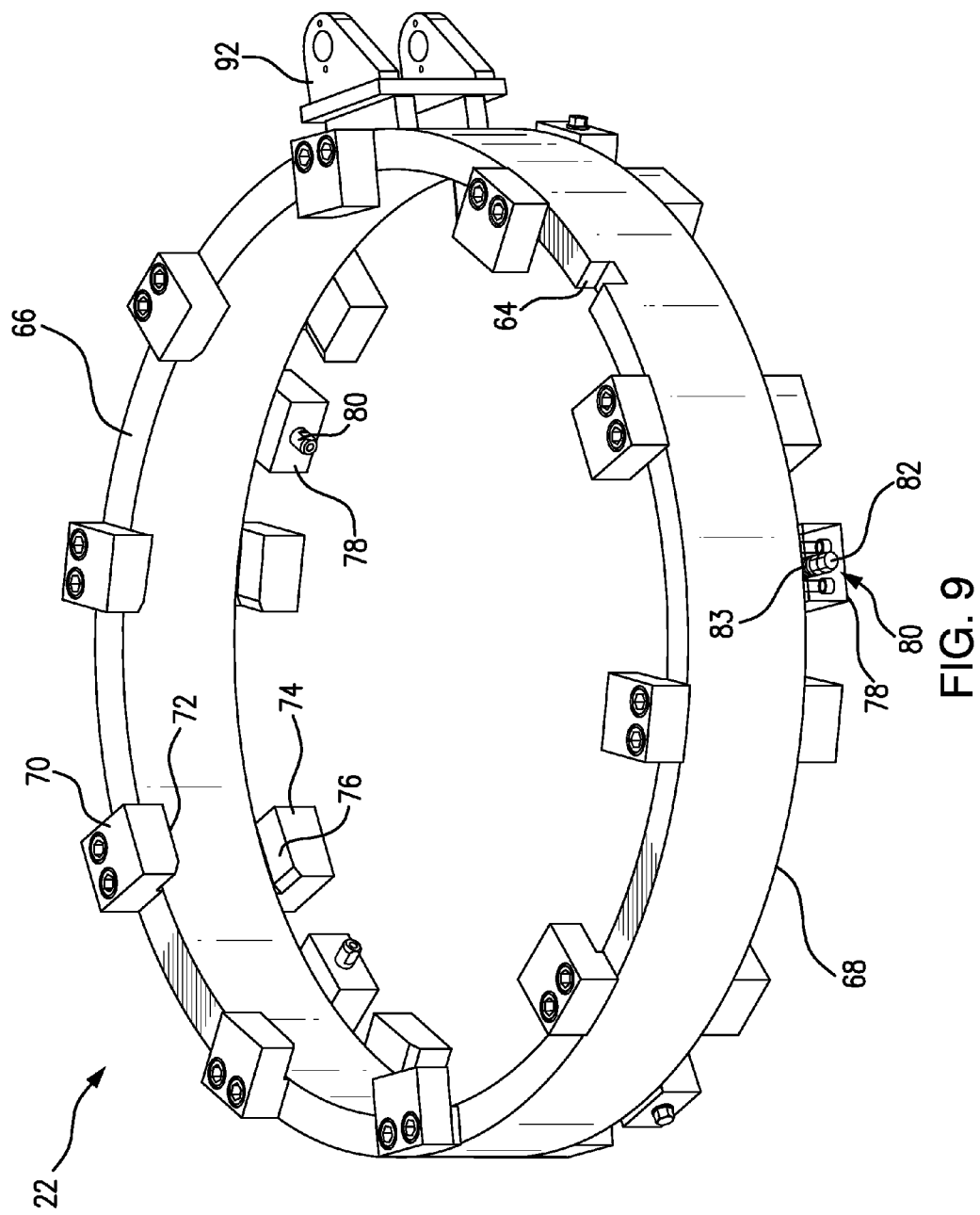
FIG. 9 is a perspective view of the locking ring removed from the filter vessel.

Referring to FIG. 9, the locking ring 22 is generally cylindrical and extends between an upper edge 66 and a lower edge 68. The notch 64 forms a cutout in the upper edge 66. An upper cam arm 70 is mounted to the upper edge 66 of the locking ring 22. The upper cam arm 70 includes a lower face defined by a camming surface 72. A lower cam arm 74 is mounted to the lower edge 68 of the locking ring 22. The lower cam arm 74 includes an upper face defined by a camming surface 76. The upper cam arm 70 and the lower cam arm 74 are aligned vertically on the locking ring 22. In the preferred embodiment, a plurality of upper cam arm 70/lower cam arm 74 pairs are spaced around the locking ring 22, such that there is an upper cam arm 70/lower cam arm 74 pair which corresponds with each upper cam block support 58/lower cam block support 42 pair.

Figure 10:
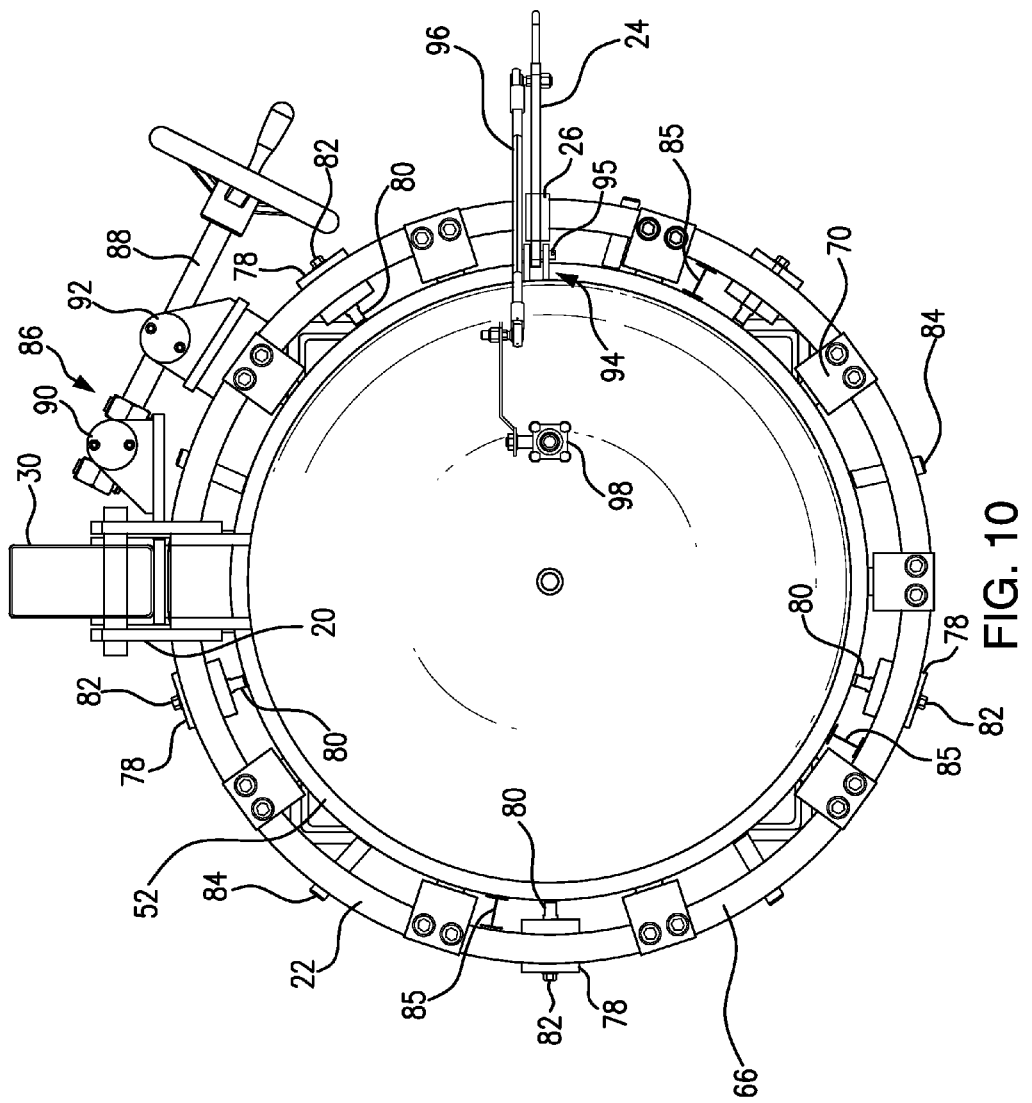
FIG. 10 is a top view of the filter vessel of FIG. 1.

The locking ring 22 includes a bushing block 78 joined to the lower edge 68. The bushing block 78 carries a spring-loaded bushing 80. Preferably, a plurality of bushing blocks 78 and associated spring-loaded bushings 80 are spaced around the locking ring 22. The bushing 80 is carried on a bolt 82 and the bushing 80 is biased against a spring 83, such that the combination of bushings 80 serve to define a gap 85 between the locking ring 22 and the lid support ring 52 and the housing support ring 36, as shown in FIG. 10. The plurality of bushings 80 serve to hold the locking ring 22 at a fixed circumferential spacing, or gap 85, from the lid support ring 52 and the housing support ring 36. The locking ring 22 is carried on the plurality of posts 84. The posts 84 support the locking ring 22 and allow the locking ring 22 to rotate between the locked and the unlocked position.

The locking ring 22 and the support column 30 are connected by a rotation member 86. In one embodiment, a screw drive 88 extends between a support 90 joined to the column 30 and an other support 92 joined to the locking ring 22, such that when the screw drive 88 is rotated, the locking ring 22 rotates about the housing 12 between the locked position and the unlocked position. One skilled in the art could readily conceive of other mechanisms for mechanically moving the locking ring 22 between the locked position and the unlocked position.

The locking arm 24 is joined to the lid 14 by the locking arm hinge 94, e.g., a locking arm bracket and pin 95. The locking arm 24 is joined by a linkage 96 to a pressure relief valve 98, such that when the locking arm 24 is rotated about the locking arm hinge 94 to the unlocked position, the pressure relief valve 98 is moved by the linkage 96 to the open position. Similarly, when the locking arm 24 is rotated about the locking an hinge 94 to the locked position, the pressure relief valve 98 is moved by the linkage 96 to the closed position. In this way, when the locking arm 24 is in the unlocked position, the pressure relief valve 98 is in the open position, thereby allowing pressure to be released from the filter vessel 10 prior to moving the locking ring 22 to the unlocked position, to help prevent the lid 14 from opening violently from built-up pressure when the locking ring 22 is moved to the unlocked position.

With the locking ring 22 in the locked position, the camming surface 72 contacts the camming surface 62 and the camming surface 76 contacts the camming surface 46. Each of the camming surfaces are ramped, such that as the locking ring 22 rotates from the unlocked position to the locked position, the contact between the respective camming surfaces forces the lid 14 to clamp against the housing 12, compressing the gasket therebetween, thereby forming a seal. The rotational movement of the locking ring 22 is translated to a linear clamping force by the respective camming surfaces. In this way, as the locking ring 22 rotates to the locked position, the gasket only experiences a linear clamping force, and does not experience any rotational forces. In the absence of rotational forces, the gasket is less likely to bind, bunch or otherwise contort in a way which will prevent proper sealing or stress or fatigue the gasket in a way which will lessen the expected operating life. The gasket is preferably formed from rubber or other resilient material, such materials are better able to withstand compression than rotational forces. As such, the present filter housing 10 provides an improved locking system which provides better sealing and better life for the gasket by removing rotational forces from the gasket.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A filter vessel comprising:
   a lid having a support portion terminating in a lower edge;
   a locking arm joined at a locking arm hinge to said lid; said locking arm having a tooth;
   a lid support ring having an inner surface which is sized to sheath around said support portion of said lid; said lid support ring joined to said lid at said support portion; said lid support ring having an outer surface which carries an upper cam block having a camming surface;
   a housing having a support portion terminating in an upper edge; said lid and said housing together defining an internal chamber for carrying a filter;
   a hinge joining said lid to said housing;
   a housing support ring having an inner surface which is sized to sheath around said support portion of said housing; said housing support ring joined to said housing at said support portion; said housing support ring having an outer surface which carries a lower cam block having a camming surface;
   a post carried on said housing support ring and extending from said outer surface of said housing support ring;
   a gasket positioned between said lid and said housing;
   a locking ring positioned around said lid support ring and said housing support ring and supported on said post; said locking ring defined as a cylinder extending between an upper edge and a lower edge; an upper cam arm joined to said upper edge and extending toward said lid support ring; a lower cam arm joined to said lower edge and extending toward said housing support ring; a spring-loaded bushing joined to said locking ring; said spring-loaded bushing defining a gap between said locking ring and said lid support ring and said housing support ring;
   a notch formed in said upper edge of said locking ring,
   a locked positioned defined by said tooth of said locking arm seated in said notch of said locking ring and said upper cam block and said lower cam block clamped between said upper cam arm and said lower cam arm; said locking ring prevented from rotating relative said lid when in said locked position; said upper cam arm and said lower cam arm clamping said lid and said housing in sealed contact with said gasket when in said locked position;
   an unlocked position defined by said tooth of said locking arm not seated in said notch of said locking ring and said upper cam block and said lower cam block not sandwiched between said upper cam arm and said lower cam arm.

* * * * *